US012344002B2

(12) United States Patent
Takamura

(10) Patent No.: US 12,344,002 B2
(45) Date of Patent: Jul. 1, 2025

(54) LIQUID SUPPLY DEVICE, LIQUID EJECTION DEVICE, AND LIQUID SUPPLY METHOD

(71) Applicant: RISO Technologies Corporation, Tokyo (JP)

(72) Inventor: Jun Takamura, Mishima Shizuoka (JP)

(73) Assignee: RISO Technologies Corporation, Tokyo (JP)

( * ) Notice: Subject to any disclaimer, the term of this patent is extended or adjusted under 35 U.S.C. 154(b) by 258 days.

(21) Appl. No.: 17/976,521

(22) Filed: Oct. 28, 2022

(65) Prior Publication Data

US 2023/0226823 A1 Jul. 20, 2023

(30) Foreign Application Priority Data

Jan. 14, 2022 (JP) ................................ 2022-004497

(51) Int. Cl.
*B41J 2/175* (2006.01)

(52) U.S. Cl.
CPC ....... *B41J 2/17563* (2013.01); *B41J 2/17596* (2013.01)

(58) Field of Classification Search
CPC ..... B41J 2/175; B41J 2/17523; B41J 2/17563
See application file for complete search history.

(56) References Cited

FOREIGN PATENT DOCUMENTS

| | | | | |
|---|---|---|---|---|
| CN | 112297631 A * | 2/2021 | ................ | B41J 2/01 |
| EP | 3378655 A1 * | 9/2018 | ............. | B41J 2/175 |
| JP | 2012006374 A | 1/2012 | | |

OTHER PUBLICATIONS

Koase, Machine TranslationofCN-112297631-A, 2018 (Year: 2018).*

* cited by examiner

*Primary Examiner* — Scott A Richmond
(74) *Attorney, Agent, or Firm* — Kim & Stewart LLP

(57) ABSTRACT

According to one embodiment, a liquid supply device includes a tank with an lower portion and an upper portion. The lower portion is partitioned into a first chamber side and a second chamber side. The upper portion permits flow of liquid between the first and second chamber sides. The first chamber side is connected by a first flow path portion to a primary side of a filter. The second chamber side is connected by a second flow path portion to the primary side of the filter. A secondary side of the filter is connected by a third flow path portion to a liquid ejection head.

20 Claims, 3 Drawing Sheets

LIQUID SUPPLY DEVICE, LIQUID EJECTION DEVICE, AND LIQUID SUPPLY METHOD

CROSS-REFERENCE TO RELATED APPLICATION

This application is based upon and claims the benefit of priority from Japanese Patent Application No. 2022-004497, filed Jan. 14, 2022, the entire contents of which are incorporated herein by reference.

FIELD

Embodiments described herein relate generally to a liquid supply device, a liquid ejection device, and a liquid supply method.

BACKGROUND

The related art discloses a liquid ejection device that includes an inkjet-type head with a filter on the ink supplying flow path to the inkjet head. When the inkjet head is being filled with ink, an air bubble removal port on the filter is opened at the start of the supplying of the ink. The air bubble removal port is closed again once ink begins to exit the air bubble removal port. The ink is then supplied at a predetermined pressure to fill the inkjet head with the ink. Removal of air bubbles from the ink as described above can also be performed by connecting a tube to the air bubble removal port. Then ink discharged when removing air bubbles via the air bubble removal portion is discarded.

DETAILED DESCRIPTION

An object of certain embodiments is to provide a liquid supply device, a liquid ejection device, and a liquid supply method for filling a liquid ejection head with ink without generating waste ink and without leaving air bubbles on a primary side of a filter.

According to one embodiment, a liquid supply device includes a tank with an lower portion and an upper portion. The lower portion is partitioned into a first chamber side and a second chamber side. The upper portion permits flow of liquid between the first and second chamber sides. The first chamber side is connected by a first flow path portion to a primary side of a filter. The second chamber side is connected by a second flow path portion to the primary side of the filter. A secondary side of the filter is connected by a third flow path portion to a liquid ejection head.

Figure 1:
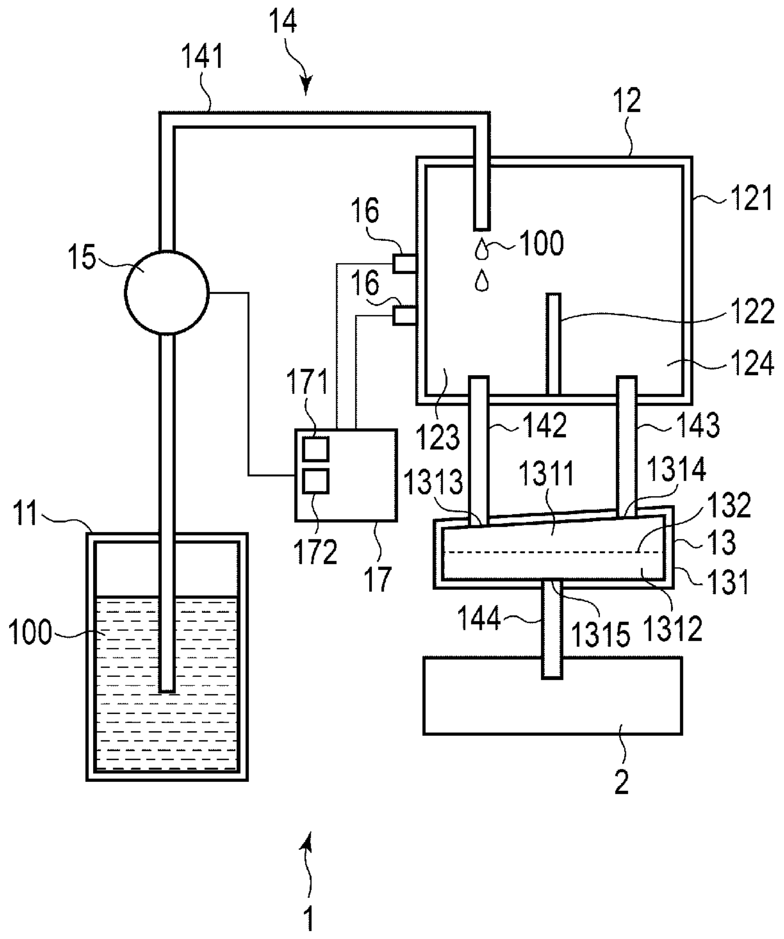
FIG. 1 is a diagram of a liquid supply device according to an embodiment.
Figure 2:
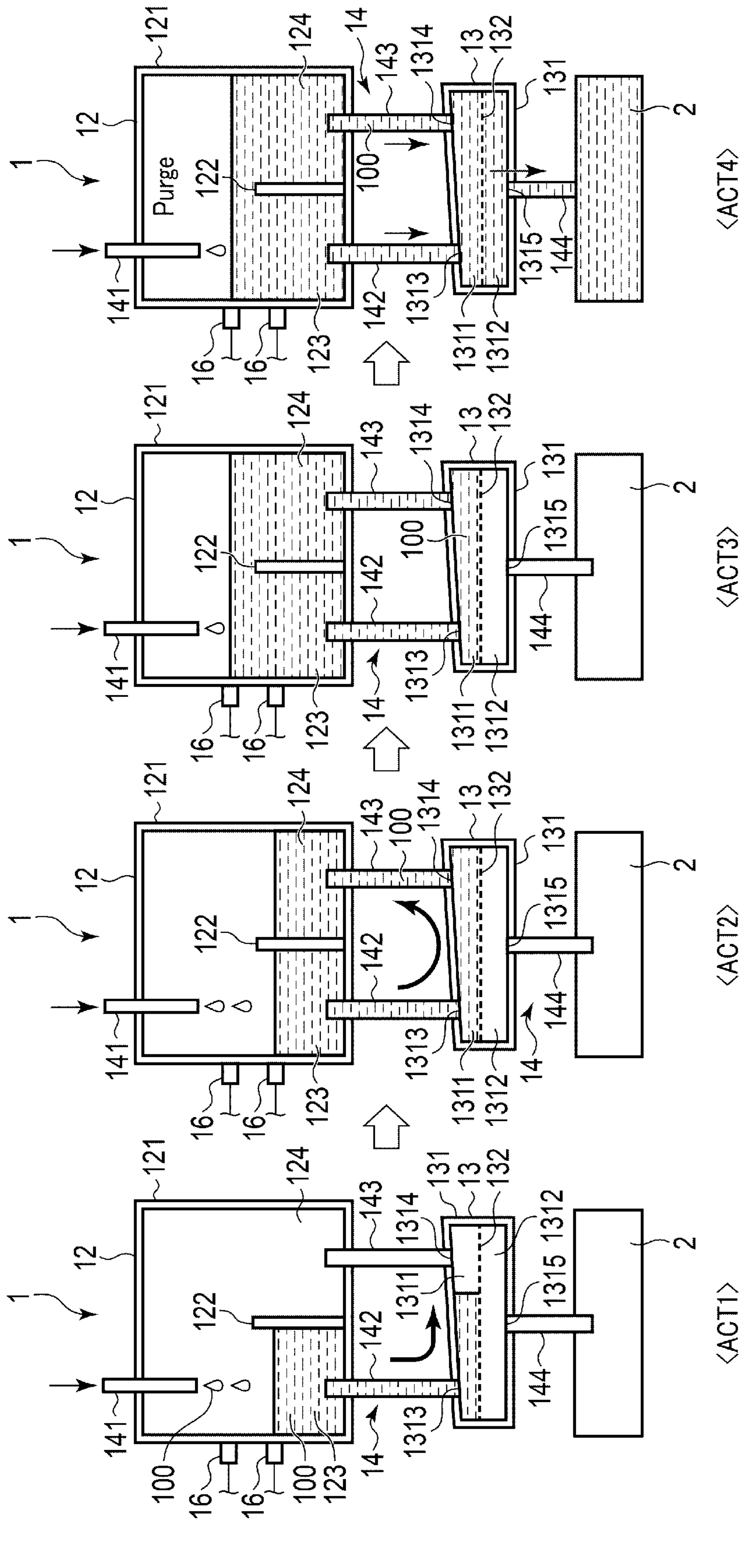
FIG. 2 is a diagram showing aspects of an example of a liquid supply method.
Figure 3:
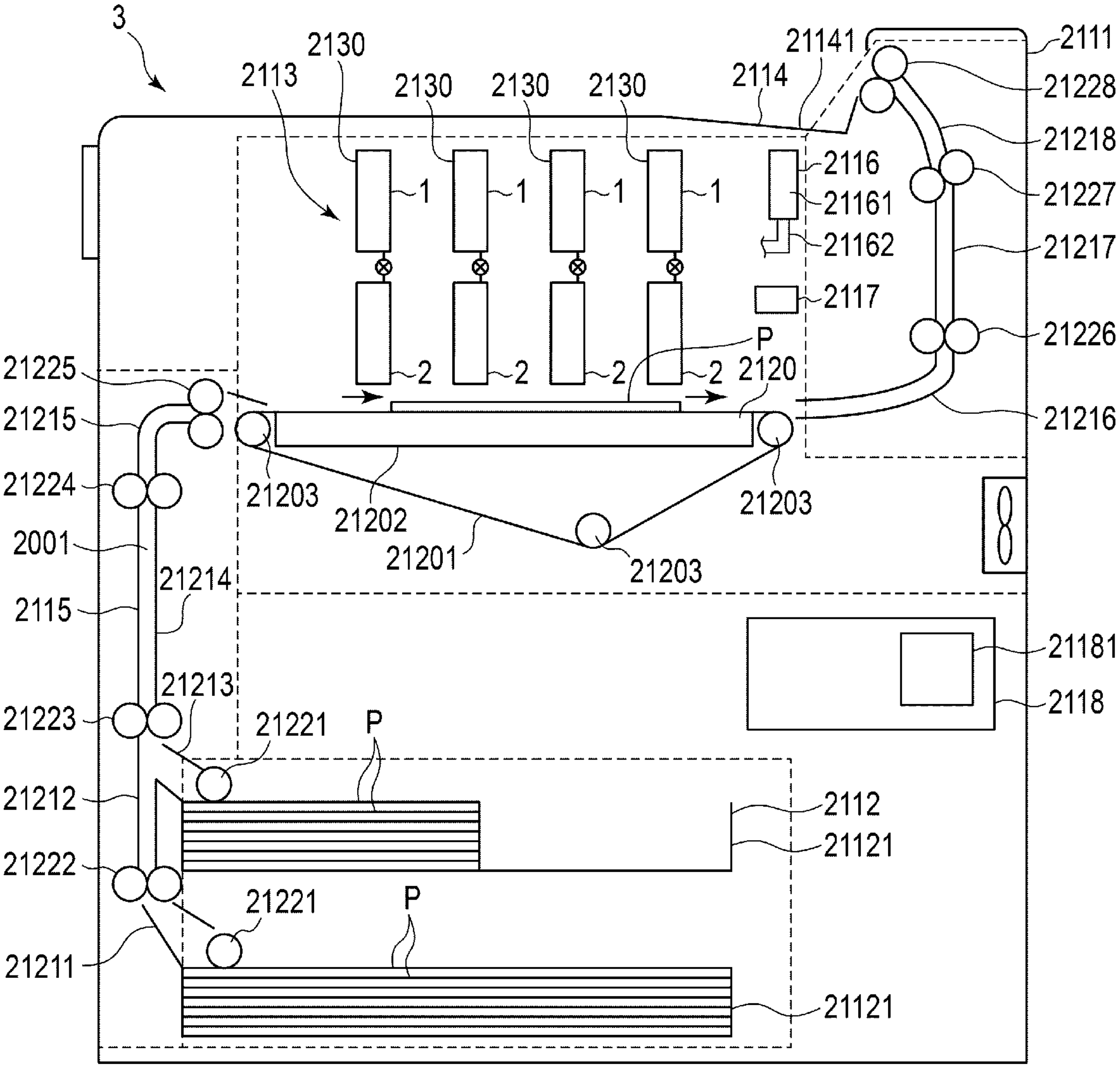
FIG. 3 is a diagram of a liquid ejection device.

Hereinafter, a liquid supply device 1 and a liquid ejection device 3 according to an example embodiment will be described with reference to FIGS. 1 to 3. FIG. 1 is a diagram schematically showing a configuration of the liquid supply device 1 according to an embodiment. FIG. 2 is a diagram showing aspects of a liquid supply method incorporating a liquid supply device 1 according to an embodiment. FIG. 3 is a diagram schematically showing a configuration of the liquid ejection device 3 according to an embodiment.

As shown in FIG. 1, the liquid supply device 1 is connected to a liquid ejection head 2. The liquid supply device 1 supplies liquid to the liquid ejection head 2. In the present embodiment, the liquid ejection head 2 is an inkjet head, and the liquid supply device 1 supplies ink 100 (liquid) to the liquid ejection head 2.

As shown in FIG. 1, the liquid supply device 1 includes a first liquid tank 11 (reservoir), a second liquid tank 12, a filter 13, a flow path 14, a supply device 15, liquid surface sensors 16, and a control unit 17.

The first liquid tank 11 stores the ink 100. The first liquid tank 11 is a main tank. The first liquid tank 11 is connected to the second liquid tank 12 via a portion (referred to as the first tube 141) of the flow path 14.

The second liquid tank 12 is connected between the first liquid tank 11 and the filter 13. The second liquid tank 12 stores the ink 100 supplied from the first liquid tank 11. The second liquid tank 12 is a sub-tank for removing air in the ink 100 that is supplied from the first liquid tank 11.

The second liquid tank 12 is connected to the first liquid tank 11 on one side and the filter 13 on the other. The second liquid tank 12 is sealed from the outside air and can have an internal pressure different from the atmospheric pressure. The second liquid tank 12 comprises a container body 121 and a partition wall 122 that partitions a lower portion of the container body 121 into two sections (or chambers). The second liquid tank 12 thus includes a first liquid chamber 123 and a second liquid chamber 124 that are separated from each other by the partition wall 122.

The partition wall 122 partitions the lower portion of the internal volume (space) of the container body 121 into the first liquid chamber 123 and the second liquid chamber 124. The first liquid chamber 123 and the second liquid chamber 124 are not separated from each other in the upper portion of the internal volume (space) of the container body 121.

The first liquid chamber 123 is connected to the filter 13 via a portion (referred to as the second tube 142) of the flow path 14. The second liquid chamber 124 is connected to the filter 13 via another portion (referred to as the third tube 143) of the flow path 14.

The filter 13 comprises a casing 131 and a filter member 132 provided in the casing 131. The casing 131 is divided into a first chamber 1311 and a second chamber 1312 by the filter member 132. The first chamber 1311 is on what is referred to as the "primary side" of the casing 131 (or filter 13), which is the side of the casing 131 that is connected to the first liquid chamber 123 and the second liquid chamber 124 via the second tube 142 and the third tube 143. The second chamber 1312 is on what is referred to as the "secondary side" of the casing 131 (or filter 13), which the side of the casing 131 that is connected to the liquid ejection head 2 via a portion (referred to as the fourth tube 144) of flow path 14.

In the present example, the casing 131 includes a supply port 1313 and an air bubble removal port 1314 that are connected to the first chamber 1311. The casing 131 includes a discharge port 1315 connected to the second chamber 1312. In the depiction in FIG. 1, the first chamber 1311 is disposed at an upper side of the casing 131 and the second chamber 1312 is disposed at a lower side of the casing 131. The upper surface of the first chamber 1311 (casing 131) is inclined upward from the supply port 1313 toward the air bubble removal port 1314. That is, the upper surface of the first chamber 1311 is angled such that air bubbles entering the first chamber 1311 from the supply port 1313 will move (rise) toward the air bubble removal port 1314, and the air bubble removal port 1314 is higher than the supply port 1313.

The supply port 1313 is connected to the first liquid chamber 123 via the second tube 142 of the flow path 14. The air bubble removal port 1314 is connected to the second liquid chamber 124 via the third tube 143 of the flow path 14. The discharge port 1315 is connected to the liquid ejection head 2 via the fourth tube 144 of the flow path 14.

The filter member 132 filters the ink 100 that passes therethrough. The filter member 132 is, for example, a filter mesh, membrane, or the like. The filter member 132 imposes a holding force N (flow resistance or pressure drop) on the ink 100. The holding force N must be exceeded for the ink 100 to pass through the filter member 132. If the pressure (ink pressure P) applied to the ink 100 at a filter surface of the filter member 132 is less than the holding force N, the ink 100 does not pass through the filter member 132. When the ink pressure of the ink 100 applied to the filter surface is equal to or greater than the holding force N, the ink 100 passes through the filter member 132.

The flow path 14 comprises, for example, a plurality of tubes formed of a metal or a resin material. The flow path 14 includes, in this example, a first tube 141, a second tube 142, a third tube 143, and a fourth tube 144. The first tube 141 connects the first liquid tank 11 and the second liquid tank 12. For example, one end of the first tube 141 is connected to a position that is located inside the container body 121 of the second liquid tank 12 and faces the first liquid chamber 123. The first tube 141 supplies the ink 100 to the first liquid chamber 123. The second tube 142 connects the first liquid chamber 123 of the second liquid tank 12 and the supply port 1313 of the filter 13. The third tube 143 connects the second liquid chamber 124 of the second liquid tank 12 and the air bubble removal port 1314 of the filter 13. The fourth tube 144 connects the discharge port 1315 of the filter 13 and the liquid ejection head 2.

The supply device 15 supplies the ink 100 from the first liquid tank 11 to the first liquid chamber 123 of the second liquid tank 12. The supply device 15 is, for example, a piezoelectric pump.

The liquid surface sensor 16 detects, for example, a liquid surface (a ink level) of the ink 100 in the second liquid tank 12. For example, two liquid surface sensors 16 are provided to detect whether the level of the ink 100 in the second liquid tank 12 is at one of two different heights. For example, a first liquid surface height as detected by the liquid surface sensor 16 is a height at a position lower than an upper end of the partition wall 122. A second liquid surface height as detected by the liquid surface sensor is height that is higher than the upper end of the partition wall 122.

The control unit 17 comprises, in this example, a processing circuit 171 such as a processor and a storage medium 172 such as a memory. The control unit 17 is connected to the supply device 15 and the two liquid surface sensors 16. The control unit 17 drives the supply device 15 to supply the ink 100 to the second liquid tank 12. In this example, the control unit 17 controls the supply device 15 to supply the ink 100 to the second liquid tank 12 at a particular pressure. For example, the ink 100 can be supplied to the second liquid tank 12 such that a pressure P (ink pressure) of the ink 100 in the second liquid tank 12 will be a first pressure P1 or a second pressure P2.

In this example, the first pressure P1 is a value at which the ink 100 will not pass through the filter member 132. That is, the first pressure P1 in the second liquid tank 12 causes the ink 100 at the primary side of the filter member 132 to be less than the holding force N of the filter member 132. The second pressure P2 is a value at which the ink 100 will pass through the filter member 132. That is, the second pressure P2 in the second liquid tank causes the ink 100 at the primary side of the filter member 132 to meet or exceed the holding force N. The second pressure P2 can also be referred to as a purge pressure (a pressure at which a purging can be performed).

The ink pressure P at the filter surface of the filter member 132 satisfies the equation P=P0+pgh.

Here, P0 is the value of the pressure in the second liquid tank 12, h is a distance between the filter surface of the filter member 132 and the ink surface in the second liquid tank 12 (h can also be referred to as a hydrostatic head height or the like), p is the density of the ink 100, and g is gravitational force. The filter surface is in the first chamber 1311.

When the holding force of the filter member 132 for holding the ink 100 is N, then the relationship P1<N<P2 generally holds.

For example, the control unit 17 drives and controls the supply device 15 to adjust the pressure (P0) in the second liquid tank 12 such that a pressure (P) applied to the filter surface is either above or below the holding force N.

For example, the control unit 17 controls the supply device 15 to supply the ink 100 from the first liquid chamber 123 to the first chamber 1311 of the filter 13 such that the ink pressure P on the filter surface is lower than the holding force N. For example, the control unit 17 supplies the ink 100 at the first pressure P1 until a liquid surface reaches the first liquid surface height.

After the ink 100 reaches the first liquid surface height, the control unit 17 controls the supply device 15 to supply the ink 100 until the liquid surface of the ink 100 in the second liquid tank 12 reaches the second liquid surface height. For example, the control unit 17 supplies the ink 100 to the second liquid tank 12 at the first pressure P1 or less until the ink 100 reaches the second liquid surface height.

When the ink 100 in the second liquid tank 12 reaches the second liquid surface height, the control unit 17 controls the supply device 15 to supply the ink 100 to the first liquid chamber 123 such that the ink pressure P at the filter surface reaches the second pressure P2 (pressure greater than the holding force N). That is, once the ink 100 in the second liquid tank 12 reaches the second liquid surface height, the control unit 17 sets the ink pressure to the second pressure P2. As a result, the ink 100 from both the first liquid chamber 123 and the second liquid chamber 124 passes through the filter member 132 and moves toward the liquid ejection head 2. In this manner, the control unit 17 controls the supply device 15 to supply the ink 100 to the liquid ejection head 2.

Next, a liquid supply method using a liquid supply device 1 will be described with reference to FIG. 2.

Such a liquid supply method is performed, for example, at the time of an initial operation (e.g., startup) of the liquid ejection device 3, after the maintenance of the liquid ejection device 3 (e.g., restart), or the like.

First, the control unit 17 controls the supply device 15 to supply the ink 100 to the second liquid tank 12 at a pressure lower than the holding force N of the filter member 132 (ACT 1). The ink 100 is supplied from the first tube 141 to the first liquid chamber 123. The ink 100 supplied to the first liquid chamber 123 moves from the second tube 142 into the casing 131 of the filter 13. At this time, since the pressure of the ink 100 at the filter surface of the filter member 132 is less than the holding force N, the ink 100 does not pass through the filter member 132.

Therefore, when the control unit 17 controls the supply device 15 to continue the supply of the ink 100, the ink 100 gradually fills the first chamber 1311 of the casing 131, and then may begin to fill the second liquid chamber 124 with ink 100 inflowing through the air bubble removal port 1314 and the third tube 143 (ACT 2). As a result, in the container body 121 of the second liquid tank 12, air bubbles are removed from the ink 100 that moved from the second liquid chamber 124 into the first chamber 1311.

Furthermore, if the control unit 17 controls the supply device 15 to continue the supply of the ink 100, the liquid surface of the ink 100 in the second liquid chamber 124 can reach the same height as the ink 100 in the first liquid chamber 123. When the control unit 17 continues to control the supply device 15 and the liquid surfaces in the first liquid chamber 123 and the second liquid chamber 124 rise, the liquid surface of the ink 100 eventually exceeds the upper end of the partition wall 122, the ink 100 in the first liquid chamber 123 and the ink 100 in the second liquid chamber 124 now communicates with each other via the ink-filled space above the upper end of the partition wall 122.

At this time, the control unit 17 controls the supply device 15 such that the ink pressure at the filter surface still has a pressure value less than the holding force N with the liquid surface of the ink 100 being at a second height position. That is, the control unit 17 drives and controls the supply device 15 such that the ink pressure P (P=P0+pgh) at the filter surface remains less than the holding force N. The control unit 17 now monitors the height of the liquid surface of the ink 100 by use of the liquid surface sensor 16.

When the liquid surface of the ink 100 as detected by the liquid surface sensor 16 reaches the second height position (ACT 3), the control unit 17 controls the supply device 15 to apply a positive pressure (a purge pressure) to an inner side of the container body 121 of the second liquid tank 12 serving as purging (ACT 4). As a result, the ink pressure at the filter surface of the filter member 132 exceeds the holding force N, and the ink 100 passes through the filter member 132. As a result, the liquid ejection head 2 will be filled with the ink 100.

After filling of the liquid ejection head 2 with the ink 100, the control unit 17 causes the supply device 15 to maintain the liquid surface of the ink 100 in the container body 121 at the second height position. According to such a method, when the liquid ejection head 2 is being filled with the ink 100, air bubbles in the ink 100 can be removed, and then the liquid ejection head 2 filled with the ink 100 from which air bubbles has been removed.

According to this example, when the ink 100 is supplied to the first chamber 1311 at the primary side of the filter member 132 in the filter 13, the ink 100 is initially returned to the second liquid chamber 124 of the second liquid tank 12 without being discharged to liquid ejection head 2. As a result, air bubbles contained in the ink 100 do not remain trapped in the filter 13, but are removed from the ink 100. Therefore, the liquid ejection head 2 can be filled with the ink 100 without air bubbles being left at the primary side of the filter 13.

That is, since the first liquid chamber 123 and the second liquid chamber 124 of the second liquid tank 12 are partitioned by the partition wall 122, it is possible to prevent any ink 100 containing air bubbles being returned from the filter 13 from being mixed with the ink 100 in the first liquid chamber 123 that is being supplied to the filter 13. The first liquid surface height is lower than the upper end of the partition wall 122. Therefore, air in the ink 100 in the second liquid chamber 124 can be removed before the ink 100 in the second liquid chamber 124 reaches a liquid surface height higher than the partition wall 122.

It is possible to prevent air in the ink 100 being returned from the filter 13 in the startup (or the like) process being immediately returned (recirculated) to the filter 13 by the ink 100 in the first liquid chamber 123 and the ink 100 in the second liquid chamber 124 merging with each other. Therefore, when the ink 100 is supplied to the liquid ejection head 2, the liquid ejection head 2 will not be filled with ink 100 that still contains air bubbles. Therefore, the liquid supply device 1 can prevent air bubbles from moving into the liquid ejection head 2.

Since the ink 100 is returned to the second liquid chamber 124 in this process without being discharged externally from the device, none of the ink 100 is lost/discarded in the process for removing air bubbles. Therefore, the liquid supply device 1 and the liquid supply method of the present example do not require any additional processing, components, or the like to account for the discarding of the ink 100 in the bubble removal processing. Likewise, no ink 100 is wasted (discarded) in this bubble removal processing, thus ink costs can be reduced. In addition, since it is not necessary to manually perform any processing to remove air bubbles from the ink 100, it is easier to fill the liquid ejection head 2 with the ink 100.

Hereinafter, a liquid ejection device 3 incorporating a liquid supply device 1 and a liquid ejection head 2 will be described with reference to FIG. 3. In this embodiment, the liquid ejection device 3 is, for example, an inkjet recording device or the like. The liquid ejection device 3 includes a housing 2111, a paper supply unit 2112, an image forming unit 2113, a paper discharge unit 2114, a conveyance device 2115 that is a support device, a temperature adjustment device 2116, a maintenance device 2117, and a control unit 2118.

The liquid ejection device 3 can be an inkjet printer that performs image forming processing on a sheet P by ejecting a liquid such as ink 100 while conveying the sheet P along a predetermined conveyance path 2001 from the paper supply unit 2112 to the paper discharge unit 2114 through the image forming unit 2113.

The paper supply unit 2112 includes a plurality of sheet feed cassettes 21121. The image forming unit 2113 includes a support unit 2120 that supports a sheet, and a plurality of head units 2130 that are disposed above the support unit 2120 and facing the support unit 2120. The paper discharge unit 2114 includes a sheet discharge tray 21141.

The support unit 2120 includes a conveyance belt 21201 provided in a loop shape and a plurality of belt rollers 21203 are provided at a back side of the conveyance belt 21201. At a predetermined region at which image formation is performed on the sheet P, a support plate 21202 that supports the conveyance belt 21201 from a back side of the conveyance belt 21201.

The head units 2130 each include at least one liquid supply device 1 and one liquid ejection head 2. The liquid ejection heads 2 may be referred to as inkjet heads in this context.

In the present embodiment, there are four head units 2130 for four colors of cyan, magenta, yellow, and black.

The conveyance device 2115 conveys a sheet P along the conveyance path 2001 from the sheet feed cassette 21121 of the paper supply unit 2112 to the sheet discharge tray 21141 of the paper discharge unit 2114 through the image forming unit 2113. The conveyance device 2115 includes guide plate pairs 21211 to 21218 arranged along the conveyance path 2001, and conveyance rollers 21221 to 21228. The conveyance device 2115 moves sheets P past the liquid ejection heads 2.

The temperature adjustment device 2116 includes a water tank 21161, a temperature adjustment flow circuit 21162 such as a pipe or a tube for supplying water for purposes of temperature adjustment/maintenance, a pump for supplying the water, a temperature adjuster that changes or maintains the temperature of the water, and the like. The temperature adjustment device 2116 causes the pump to feed water at a predetermined temperature (as controlled/set by the temperature adjuster) in the water tank 21161 to a temperature adjustment water supply tube via the temperature adjustment flow circuit 21162. The temperature adjustment device 2116 collects water discharged from a temperature adjustment water discharge tube in the temperature adjustment water tank 21161 via the temperature adjustment circuit flow 21162. The temperature adjustor is, for example, a heater and/or a cooler (chiller).

The maintenance device 2117 suctions and collects ink 100 remaining on an outer surface of a nozzle plate of the liquid ejection head 2 during a maintenance process. When the liquid ejection head 2 is of a non-circulation type, the maintenance device 2117 collects the ink 100 from a nozzle of the liquid discharge head 2 at the time of maintenance. Such a maintenance device 2117 includes a tray, a tank, or the like for storing the collected ink 100.

The control unit 2118 includes a CPU 21181 (a processor), a memory such as read only memory (ROM), random access memory (RAM), and an interface unit for sending and receiving data and the like to/from the outside. The control unit 2118 may be integrated with the control unit 17 of the liquid supply device 1. The ROM of the control unit 2118 stores various control programs or the like. The RAM of the control unit 2118 various parameters, process data, image data (print data), or the like.

With the liquid supply device 1 as described above incorporated into the liquid ejection device 3, it is possible to fill the primary side of the filter 13 with the ink 100 without leaving air bubbles at the primary side of the filter 13 and without discarding the ink 100.

The example embodiments are not limited to the above-described configurations. In another example, the ink pressure P applied to the ink 100 at the filter surface may be controlled by a component other than the supply device 15, or such another component may be provided in combination with the supply device 15. For example, the ink pressure P may be adjusted by another pump or the like that increases the pressure inside the second liquid tank 12, or the ink pressure P at the filter surface may be adjusted by changing a liquid surface height in the second liquid tank 12.

In an example, two liquid surface sensors 16 are provided on a side of first liquid chamber 123, and one of the liquid surface sensors 16 detects the first liquid surface height in the first liquid chamber 123 and the other the second liquid surface height. In another example, liquid surface sensors 16 may be provided on both the first liquid chamber 123 side and the second liquid chamber 124 side at relevant positions.

For example, when a liquid surface sensor 16 is provided on the second liquid chamber 124 side, the liquid surface sensor 16 can be installed at a position lower than the lowermost liquid surface sensor 16 provided on the first liquid chamber 123 side. Since a liquid surface sensor 16 is provided at the second liquid chamber 124 side in this manner, it is possible to detect when ink 100 enters the second liquid chamber 124 from the filter 13 side before the ink 100 in the second liquid tank 12 reaches the second liquid surface height, and thus it may be possible to end an ink filling operation at an earlier time.

The configuration including the two liquid surface sensors 16 that detect the first liquid surface height and the second liquid surface height is described as one example, but the embodiment is not limited thereto. For example, a single liquid surface sensor 16 that just detects the second liquid surface height may be provided, or purging may be performed using the pressure in the second liquid tank 12 without providing a liquid surface sensor 16, or purging may be performed based on a monitored drive time of the supply device 15 (e.g., how long the pump has been run). That is, in general, the liquid supply device 1 may be configured to detect and/or estimate the liquid surface of the ink 100 in various manners as long as such manner of detection and/or estimation does not limit the liquid supply device 1 substantially prevent removal of air bubbles from the ink 100 moved to the second liquid chamber 124 or ejection or supply of the ink 100.

According to at least one embodiment, air bubbles can be removed from the primary side of the filter 13 without discarding any ink 100 in the bubble removal process.

While certain embodiments have been described, these embodiments are presented by way of example only, and are not intended to limit the scope of the present disclosure. The novel embodiments can be implemented in various other forms and various omissions, substitutions and modifications can be made without departing from the spirit of the present disclosure. Such embodiments and modifications thereof are included in the scope and spirit of the disclosure, and are included in the claims and equivalents of thereof.

What is claimed is:

1. A liquid supply device, comprising:

a tank with an lower portion and an upper portion, the lower portion partitioned into a first chamber side and a second chamber side, the upper portion permitting flow of liquid between the first and second chamber sides;

a pump configured to supply liquid from a reservoir to the first chamber side of the tank; and a fourth flow path portion from the pump to a position on the tank above the first chamber side, wherein the first chamber side is connected by a first flow path portion to a primary side of a filter, the second chamber side is connected by a second flow path portion to the primary side of the filter, and a secondary side of the filter is connected by a third flow path portion to a liquid ejection head.

2. The liquid supply device according to claim 1, further comprising:

a controller configured to control the pump to supply liquid to the tank at a first pressure, wherein the first pressure is equal to or less than a flow resistance of liquid from the primary side to the secondary side of the filter.

3. The liquid supply device according to claim 2, wherein the controller is further configured to control the pump to supply liquid to the tank at a second pressure, and the second pressure is greater than the flow resistance.

4. The liquid supply device according to claim 1, wherein the first flow path portion is longer in length than the second flow path portion.

5. The liquid supply device according to claim 1, further comprising:

the filter, wherein the filter includes a casing and a filter member inside the casing, the first flow path portion is connected to an upper surface of the casing at a first position, the second flow path portion is connected to the upper surface of the casing at a second position, and the upper surface of the casing slopes upward from the first position to the second position.

6. The liquid supply device according to claim 1, further comprising:

the liquid ejection head.

7. The liquid supply device according to claim 6, wherein the liquid ejection head is an inkjet head.

8. A liquid ejection device, comprising:

a reservoir;

a liquid ejection head connected to the reservoir by a flow path;

a tank on the flow path between the reservoir and the liquid ejection head; and a filter on the flow path between the tank and the liquid ejection head;

a pump configured to supply liquid from the reservoir to the first chamber side of the tank; and a fourth flow path portion from the pump to a position on the tank above the first chamber side, wherein the filter has a filter member separating the filter into a primary side and a secondary side, the tank has with an lower portion and an upper portion, the lower portion is partitioned into a first chamber side and a second chamber side, the upper portion of the tank permits flow of liquid between the first and second chamber sides, the first chamber side is connected by a first flow path portion to the primary side of the filter, the second chamber side is connected by a second flow path portion to the primary side of the filter, and the secondary side of the filter is connected by a third flow path portion to a liquid ejection head.

9. The liquid ejection device according to claim 8, further comprising:

a controller configured to control the pump to supply liquid to the tank at a first pressure, wherein the first pressure is equal to or less than a flow resistance of liquid from the primary side to the secondary side of the filter.

10. The liquid ejection device according to claim 9, wherein the controller is further configured to control the pump to supply liquid to the tank at a second pressure, and the second pressure is greater than the flow resistance.

11. The liquid ejection device according to claim 8, wherein the first flow path portion is longer in length than the second flow path portion.

12. The liquid ejection device according to claim 8, wherein the filter includes a casing, and the filter member is inside the casing;

the first flow path portion is connected to an upper surface of the casing at a first position, the second flow path portion is connected to the upper surface of the casing at a second position, and the upper surface of the casing slopes upward from the first position to the second position.

13. The liquid ejection device according to claim 8, wherein the liquid ejection head is an inkjet head.

14. A liquid supply device, comprising:

a tank with an lower portion and an upper portion, the lower portion partitioned into a first chamber side and a second chamber side, the upper portion permitting flow of liquid between the first and second chamber sides;

a pump configured to supply liquid from a reservoir to the first chamber side of the tank; and a controller configured to control the pump to supply liquid to the tank at a first pressure, wherein the first chamber side is connected by a first flow path portion to a primary side of a filter, the second chamber side is connected by a second flow path portion to the primary side of the filter, a secondary side of the filter is connected by a third flow path portion to a liquid ejection head, and the first pressure is equal to or less than a flow resistance of liquid from the primary side to the secondary side of the filter.

15. The liquid supply device according to claim 14, wherein the controller is further configured to control the pump to supply liquid to the tank at a second pressure, and the second pressure is greater than the flow resistance.

16. The liquid supply device according to claim 14, further comprising:

the filter, wherein the filter includes a casing and a filter member inside the casing, the first flow path portion is connected to an upper surface of the casing at a first position, the second flow path portion is connected to the upper surface of the casing at a second position, and the upper surface of the casing slopes upward from the first position to the second position.

17. The liquid supply device according to claim 16, further comprising:

the liquid ejection head.

18. The liquid supply device according to claim 14, further comprising:

the liquid ejection head.

19. The liquid supply device according to claim 18, wherein the liquid ejection head is an inkjet head.

20. The liquid supply device according to claim 14, wherein the first flow path portion is longer in length than the second flow path portion.

* * * * *